April 6, 1965 — M. U. CLAUSER — 3,176,519
SUPERCONDUCTING INERTIAL REFERENCE SYSTEM
Filed Aug. 19, 1959 — 5 Sheets-Sheet 1

MILTON U. CLAUSER
INVENTOR.

BY
ATTORNEY

April 6, 1965 M. U. CLAUSER 3,176,519
SUPERCONDUCTING INERTIAL REFERENCE SYSTEM
Filed Aug. 19, 1959 5 Sheets-Sheet 2

Fig. 3

MILTON U. CLAUSER
INVENTOR.

April 6, 1965 M. U. CLAUSER 3,176,519
SUPERCONDUCTING INERTIAL REFERENCE SYSTEM
Filed Aug. 19, 1959 5 Sheets-Sheet 5

MILTON U. CLAUSER
INVENTOR.

BY
ATTORNEY

United States Patent Office 3,176,519
Patented Apr. 6, 1965

3,176,519
SUPERCONDUCTING INERTIAL REFERENCE
SYSTEM
Milton U. Clauser, Rolling Hills, Calif., assignor to
Thompson Ramo Wooldridge Inc., Los Angeles,
Calif., a corporation of Ohio
Filed Aug. 19, 1959, Ser. No. 834,809
27 Claims. (Cl. 73—505)

This invention relates to superconducting inertial reference system and more particularly to an inertial reference system provided with superconducting cavities for supplying yaw, pitch and roll references.

Some present well known systems capable of providing inertial guidance utilize either spinning masses or vibrating masses capable of operation in substantially fixed relative planes for the purpose of providing references for guidance purposes. However, due to spinning mass bearing friction or internal resistance of resilient members supporting the vibrating masses, a substantial amount of precession occurs causing errors in the guidance system reference. Many steps have been taken to reduce errors due to bearing friction such as for example, providing a drive means for driving the outer races of the support bearings for a spinning mass in opposite directions. Although this provides some improved operational conditions, it is obvious that some bearing friction still exists and, therefore, causes the introduction of error into the guidance system.

It is, therefore, an object of this invention to provide a guidance system utilizing radio frequency waves within a superconductive cavity as a reference for each of the three major axes.

It is another object of this invention to provide a guidance system utilizing reference radio frequency waves within an extremely high "Q" superconductive cavity.

It is another object of this invention to provide a guidance system having reference energy that is free from precession due to friction.

It is still another object of this invention to provide a guidance system utilizing radio frequency waves as a guidance reference within cavities having extremely low energy loss.

An additional object of this invention is to provide a guidance system having substantially perfect guidance accuracy.

It is another object of this invention to provide a three axis reference system using two reference cavities.

Other objects, purposes and characteristic features will become clear as the description of the invention progresses.

In practicing this invention, there is provided a plurality of superconductive enclosures forming cavities capable of receiving radio frequency energy which is propagated to form node position within the cavities. The enclosures are positioned in fixed relationship with each other to represent the yaw, pitch and roll axes. Each cavity is provided with a detector means for detecting the node position and to provide an output in response to a deviation of the detector means away from the node position. With the enclosures forming the cavities being freely gimbaled, and with each enclosure being provided with a drive mechanism for repositioning each in response to a deviation detection by its detector means, it is only necessary to provide a drive mechanism output for vehicle control in response to repositioning of each enclosure and drive means upon deviation detection by each detector. It should be pointed out at this time that the only cause of deviation of the enclosure cavities with respect to the injected radio frequency wave within each cavity is the movement of each enclosure about its radio frequency wave upon vehicle deviation from the desired course. In view of the fact that no bearing friction or windage exists within the enclosure cavities, no error is introduced in the reference waveforms.

In each of the several views similar parts bear like reference characters.

It has been known for many years that the electrical resistance of metal decreases with the lowering of temperature. With further experiments, however, it has been determined that certain materials apparently reduce their electrical resistance to approximately zero at temperatures approaching absolute zero. This phenomenon has been referred to as the superconductive qualities of the materials being used. By utilizing this superconducting quality in forming a cavity by an enclosure such as a sphere and then injecting into the cavity a radio frequency wave having a half wave length equal to substantially the diameter of the cavity, ($\lambda \approx 2.29a$) where $a$ is the radius of the sphere, little or no energy is expended by the waveform energy that is propagated within the superconductive cavity. Long periods after the injection of the energy within the cavity, little or no attenuation of the energy would be detected.

There are several kinds of nodes, for example, there can be an electric field node, a magnetic field node as well as a current node. For the systems illustrated herein and graphically demonstrated in FIGURES 4 and 5 and for the wave propagation shown, which is of the lowest order with the electric field shown flowing in the direction of the arrows, the maximum of the electric field will exist along the axis with the electric field falling to zero at the surface of this sphere. At the same time the magnetic field shown by the dots dispersed within the field area will be at zero along the axis and the maximum in an area adjacent the intersurface of the sphere.

Figure 1:
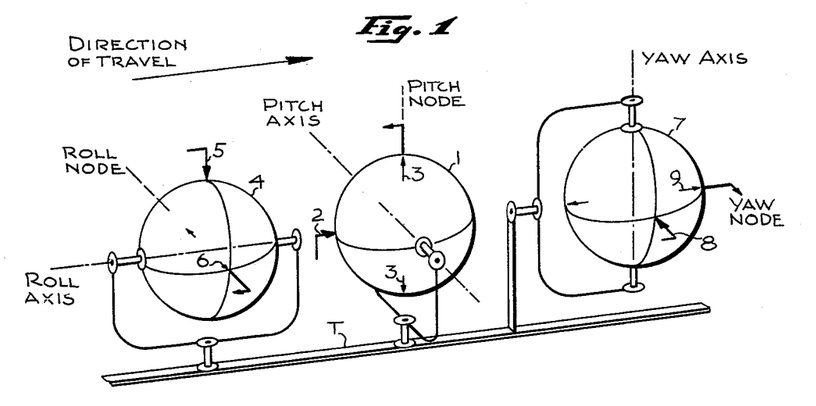
FIGURE 1 is a diagrammatic view of three spheres having waveforms injected therein at the proper positions to provide the three basic reference axes herein designated X, Y and Z.

If we now consider the schematic representation of FIGURE 1 it can be seen that if a radio frequency is injected into a spherical cavity such as formed by the sphere 1 at a point 2 and if the sphere 1 is electrically perfect, a magnetic field node will exist along a line indicated by the arrow 3. At this same point, a current node will exist in the surface of the sphere at one of the points 3. It is at one of the points 3 that a detector is introduced through the sphere 1 and since the detector is basically at the node position, little or no losses will occur. In addition to the sphere 1, if we also provide a sphere 4 with an energy injection point indicated at 5, a magnetic field node will exist along the line indicated by the arrow 6. Since the point of injection in this sphere 4 is displaced with respect to the point of injection in the sphere 1, this sphere is capable of operation in a different plane. In order to provide complete directional control, a third sphere is provided for detection in a third reference plane. For this purpose, the sphere 7 is provided having an injection point at 8 and a node detection for the magnetic field indicated by the arrows 9. With the three spheres, the three necessary reference planes are provided giving roll, pitch and yaw detection.

In FIGURE 1, the three spheres are shown gimbaled supported on a single reference support or table T in order to clearly show the inter-related cooperation of the spheres. The gimbals for each of the spheres are provided to prevent excessive energy losses from the spheres due to a deviation of the vehicle from its desired course as will be explained hereinafter.

It should be pointed out at this time that although three superconductive cavities or spheres have been shown in FIGURE 1 a complete three plane detecting system can be accomplished through the use of two cavities or spheres, as will be described hereinafter in connection with FIGURE 7.

Figure 2:
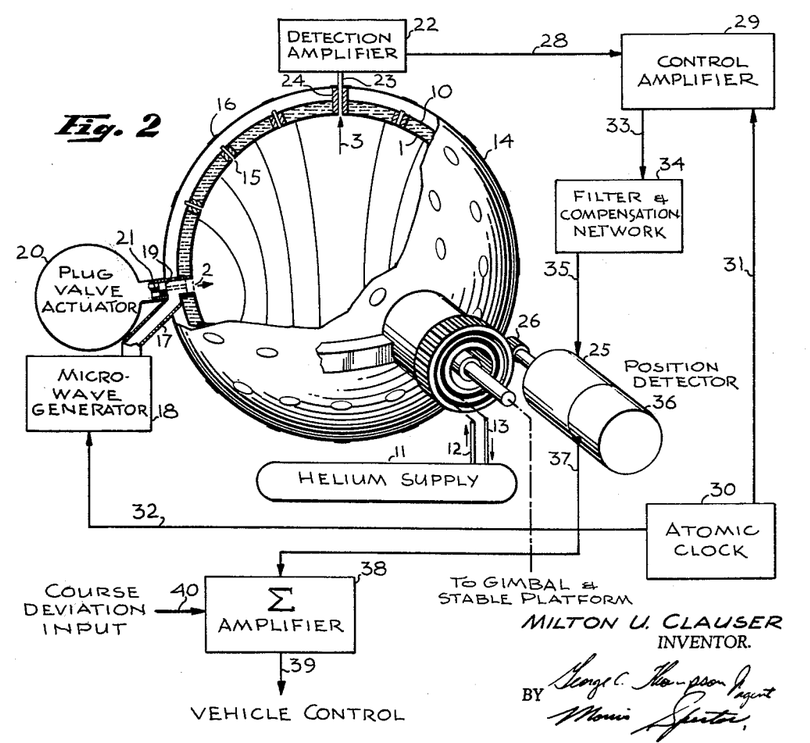
FIGURE 2 is a view of a typical superconductive sphere representing one of the planes and showing waveform injection, node detection and a typical control system.

In order to understand clearly what is necessary to provide a radio frequency waveform for one detection plane, a more detailed structure is presented in FIGURE 2 and is explained hereinafter. In FIGURE 2, the injection and detection of energy into and out of, respectively, the sphere 1 is shown to be in the form of wave guides. It is pointed out, however, that the energy may be injected and detected by other structures such as dipoles (not shown).

The sphere 1 shown in FIGURE 2 is preferably formed of material capable of superconducting operation such as lead and capable of providing a high "Q" resonant chamber. Since, however, lead is inherently weak in structural strength, it is necessary to provide a structural sphere of some stronger material provided with a lead coating on the interior thereof of sufficient depth to provide for an energy change in the lead when it goes superconducting that is greater than the energy injected in radio frequency form. Although the cavity is herein shown as a sphere, it is pointed out that other shaped cavities also could be used.

Since the superconductive sphere is only superconducting during temperatures approaching absolute zero, it is necessary to supply this sphere with a cooling medium such as liquid helium. In order to contain the liquid helium about the superconductive sphere 1, an enclosing outer sphere 10 spaced from the sphere 1, is provided. The area between the inner sphere 1 and its adjacent outer sphere 10 is then filled with helium from a helium supply 11 piped into the cavity formed by the spheres 1 and 10 through suitable insulated pipes 12 and 13. Since the spheres 1 and 10 are supercooled to a point near absolute zero, it is necessary to insulate the spheres to prevent excessive losses. For protection against excessive thermal losses, a third sphere 14 is positioned about the sphere 10, and spaced therefrom. The area between the spheres 10 and 14 is then evacuated and sealed thus forming a suitable vacuum bottle for preventing the losses.

Since a perfect electrical sphere can not readily be formed, it is necessary to provide suitable electrical shims 15 for adjusting the electrical quantities of the superconducting sphere 1 to be electrically perfect (basically a mechanically perfect sphere tuned to a high resonance) to an injected waveform. The shims are made available through suitable sealing plugs 16 in the evacuated sphere 14.

Several different modes of wave propagation within a sphere are possible. The one illustrated in the present application is commonly referred to as the lowest order of wave propagation within a sphere and is used as an illustration only since it is the simplest to demonstrate and understand. This mode of operation may be excited in several different ways such as a magnetic coil, a dipole fed by a coaxial cable or a slot fed by a wave guide. Whatever the method used for exciting the sphere the feed mechanism should be made electrically to disappear in order to reduce the losses that would be encountered by the mechanism remaining within the sphere.

Figures 4, 5:
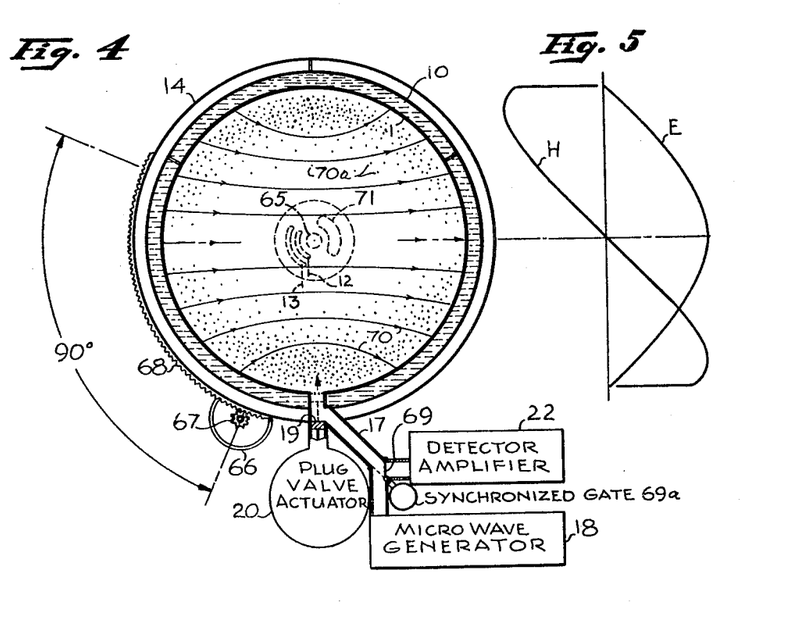
FIGURE 4 is a view of another superconducting sphere provided with a common injection and detection opening.
FIGURE 5 is a graph showing the relationship existing at one instant between the electric field and the magnetic field within a sphere.

In order to position the node of an injection waveform along the node line 3 of the superconducting sphere 1, the point of wave propagation or injection should be displaced therefrom by 90° and at a point that is relatively high in energy level in the magnetic field such as shown by the curve H in FIGURE 5. As shown in FIGURE 2, the point of injection 2 would be nearly at the maximum field potential level as shown by the curve H. The method of injection shown in FIGURE 2 involves the use of an opening 2 provided with a suitable wave guide 17 connected to an energy supply or microwave generator 18. In order to maintain the superconducting qualities of the sphere after injection of energy into the sphere, a suitable sealing plug 19 is provided and is movable from its open position, as represented in FIGURE 2, to a position forming a substantially smooth internal surface for the sphere 1. The plug valve 19 is moved by an actuator 20 connected to the plug valve 19 through a suitable link 21.

It, therefore, can be seen that with the plug valve 19 in its retracted position, energy can be emitted from the microwave generator 18 through the wave guide 17 into the sphere 1 and immediately following the energy entrance into the sphere the plug valve 19 can be rapidly moved to its sealing position. With the plug in position the energy is prevented from being expended back through the wave guide opening thus keeping losses to a minimum. In addition, the adjustable shims 15 can be moved in and out as is necessary to form a tuned or electrically perfect sphere.

At this point, we now have the radio frequency wave established with the superconductive sphere 1 with its node along the line 3. In order to provide a means of sensing movement of the superconductive sphere about the injected radio frequency energy, a detector amplifier 22 having a wave guide 23 entering through the sphere 1 along the node line 3 is provided. Wave guide 23 is provided with suitable insulation 24 for reducing thermal conduction losses to a minimum.

As long as the sphere 1 is maintained in the exact position occupied during waveform injection, the wave guide 23 will be positioned along the node line 3. If, however, the sphere is rotated, causing detector wave guide 23 displacement from the node position, energy will be passed through the wave guide 23 to the detection amplifier 22. A deviation of extremely small amounts from the node position will result in energy detection by the detection amplifier 22.

Figure 3:
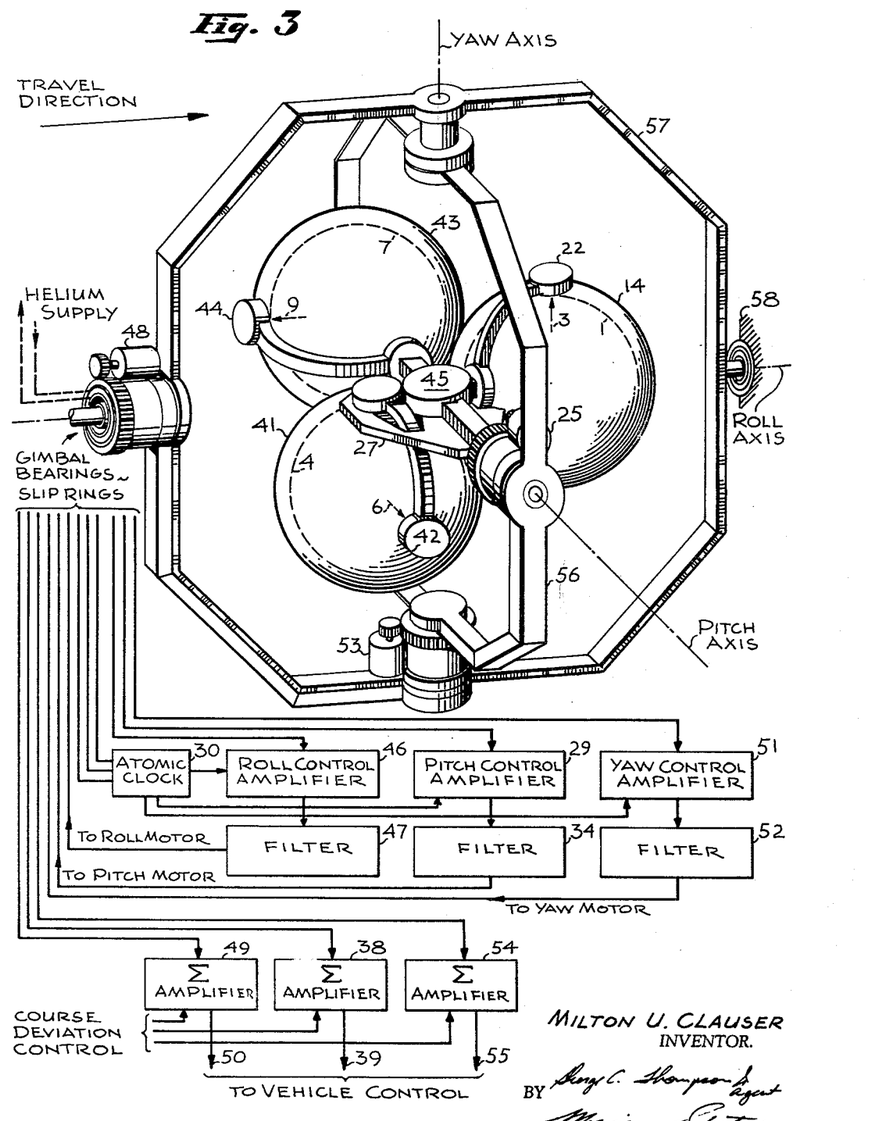
FIGURE 3 is a diagrammatic view of three superconducting spheres mounted on a gimbaled platform and provided with a typical control system.

In order to keep losses to a minimum in the injected wave within the sphere 1, a suitable drive means or motor 25 is provided for returning the sphere to node position as soon as deviation occurs. The motor 25 is connected through suitable mechanical gearing linkage 26 to a sphere supporting platform T which is gimbaled for free directional movement such as shown in FIGURE 3. Under some conditions the sphere may be separately gimbaled (not shown). The motor 25 is driven in response to deviation detection by the detection amplifier 22 which provides an output through the output path 28 to a phase sensitive control amplifier 29. The control amplifier 29 is provided with a control input from a suitable reference means such as an atomic clock 30 over an input path 31.

A typical atomic clock is described in principle in the article by Harold Lyons appearing on page 71 of the February 1957 Scientific American. As described in this article, atomic clocks have been made using ammonia and cesium. In addition, "Maser" clocks have also been made using ammonia.

The purpose of the atomic clock 30 is to provide an exact reference for detecting phase relationship of the signal from the detector amplifier 22 for determining the direction of rotation of motor 25. In order to provide a phase or error reference, the atomic clock is used as a reference for the microwave generator 18 through a timing control path 32. The output signal of the detection amplifier 22 is compared with the output signal of the atomic clock 30 resulting in an output over the path 33 to suitable filters 34, capable of providing an output over path 35 to the motor 25. Movement of the motor 25 is then detected by a suitable deviation detector 36 which provides an output signal over the path 37 to a summation amplifier 38 capable of providing an output signal over the output path 39 for vehicle control.

The summation amplifier 38 is provided with an additional input path 40 for the purpose of directing a vehicle deviation from the original path. To provide this control an input signal is provided over the path 40 to the summation amplifier 38 which results in a vehicle output control over the path 39. As the vehicle begins to deviate from its original path the detector amplifier 22 detects the deviation and causes the control amplifier 29 to drive the motor 25 to reposition the sphere 1 and detector amplifier 22 to the node line 3. Movement of the motor 25 results in a signal from the deviation detector 36 to the summation amplifier 38. This signal, to the amplifier 38 over the path 37, eventually balances the input signal from the path 40 when the directed deviation of the vehicle from the original path has been satisfied.

The energy within the sphere 1, however, is not dissipated due to the new course since the detection amplifier 22 has been repositioned to the node of the injected waveform.

It is pointed out at this time that the detection amplifier 22 can be displaced in two different planes falling along the node line 3 thus resulting in a signal being detected by the amplifier 22. If, however, the system used is one involving a desired detection in one plane only, the electrical circuitry is such that the phase of the detected signal as compared to the atomic clock signal can be passed only when the deviation is in the proper plane. In order to prevent energy losses due to detection amplifier movement along the unwanted plane, the desired system utilizes a gimbaled platform with detection spheres for each of the other planes also mounted thereon. With this arrangement, deviation from node position in any plane will be rapidly corrected with detection resulting only in the desired sphere for each plane.

Referring now to FIGURE 3, there is shown a complete guidance system utilizing three superconductive spheres gimbaled for three axes rotation. In addition to the previously described pitch axis sphere 1 and its detector amplifier 22 there is provided for the roll detection superconductive sphere 4 a suitable evacuated shell such as a sphere 41 and a suitable detector amplifier 42. Similarly, the yaw detection sphere 7 is provided with a vacuum shell, such as a sphere 43, and a suitable detector amplifier 44. The microwave generator and plug valve control mechanisms are located within a suitable container 45 interconnecting the three spheres and will not be shown in detail since a typical schematic arrangement for one sphere has been shown and described hereinbefore.

The control system shown in the system of FIGURE 3, is a complete system for three sensing spheres similar to the single sphere described in connection with FIGURE 2. The system provides control by each of the spheres for the axes shown in FIGURE 3. For example, the pitch control sphere is provided with a pitch control amplifier 29, a filter compensation network 34, a pitch motor 25, a pitch summation amplifier 38 and a vehicle control output 39. Likewise, the roll axis control sphere 4 is provided with a detection amplifier 42, a roll control amplifier 46, suitable filters 47, a roll control motor 48, a roll summation amplifier 49 and a roll control output path 50. The yaw control is provided by the yaw control sphere 7, its detection amplifier 44, a yaw control amplifier 51, suitable filters 52, a yaw control motor 53, a yaw summation amplifier 54, and a yaw output vehicle control path 55. Each detector sphere and its control system acts to maintain platform T stabilized along its respective axes and with reference to the sphere injected energy by providing output signals to the axis drive motors which provide outputs to the vehicle control system over the respective output circuits 39, 50 and 55. The atomic clock provides reference signals for each of the control amplifiers and for the microwave generator or generators within the container 45.

The platform T is supported for pivotal movement on a suitable gimbal 56 which is in turn pivotally supported on a second support gimbal 57 which is also pivotally supported on a suitable vehicle support 58. The axes of rotation for the platform and each of the gimbals represent each of the three planes of sensing.

In order to simplify the superconductive sphere for the purpose of maintaining energy losses to a minimum, it may be desirable to provide microwave injection and detection through the same device. The structure of FIGURE 4 shows one typical system arrangement capable of accomplishing this result using a wave guide.

If we assume again that the sphere shown in this figure is the pitch control sphere 1, it can be seen that the sphere 1 is again provided with the surrounding spheres 10 and 14 for the purpose of providing helium cooling and evacuated zones as described in FIGURE 2. The helium supply, lines 12 and 13, are shown in phantom lines since it is necessary to provide the helium through a pivot platform support provided by the pivot 65. The pivot 65 is necessary in order to move the wave guide from injection position to detection position for the two different modes of operation on its platform (not shown in this figure). This repositioning is provided by a suitable control drive means or motor 66 provided with a pinion gear 67 meshed with a suitable linear rack type gear 68 mounted along a portion of the periphery of the evacuated shell 14.

Since the wave guide 17 serves as detection wave guide as well as injection wave guide, it is necessary to have a function switch 69 for providing the two different modes. If we assume that the wave guide switch is in the position shown in FIGURE 4, with the plug valve 19 withdrawn by the plug valve actuator 20, microwave energy is at this time being injected into the sphere 1 to form the energy pattern represented by the electrical field lines 70 and magnetic field dots 70a. When the energy level is of sufficient strength, the plug valve is moved into closed position by the plug valve actuator 20, the function switch 69 is moved to its opposite "phantom line" position by a suitable actuator 69a and the motor 66 is energized to drive the sphere counter-clockwise for 90°. When in the 90° position from that shown in FIGURE 4, the plug valve actuator again retracts the plug valve 19 to open the wave guide 17 to possible entrance of energy into wave guide 17 and detector amplifier 22. If the sphere 1 is displaced in a direction moving the wave guide 17 away from node position by deviation of the vehicle from its intended course, energy is then accepted by the guide 17 and amplifier 22.

FIGURE 5 is a graph showing schematically the energy levels found within the sphere of FIGURE 4, at one instant. As shown here the ordinant axis represents the energy axis while the abscissa directly corresponds to the diameter of the sphere. With H representing the magnetic field and E representing the electric field, it can be seen that the sphere as shown in FIGURE 4 would have zero magnetic field along a center axis that is horizontal in the position shown in FIGURE 4 while the electric field represented by E is at a maximum at this point. It is also clear that the electric field falls to zero at the top and bottom of the sphere as positioned in FIGURE 4 while the magnetic field is just slightly below its highest potential point. It should further be clear, therefore, that after injection of energy by wave guide 17 into the sphere 1, and rotation of the wave guide to a position to 90° from the position shown in FIGURE 4, the wave guide would be a the point of zero magnetic field potential, since the sphere is rotated about the propagated wave therein.

It is pointed out that the motor 66 moves the sphere 1 and its outer shell 14 through 90° only, and at this time is deenergized and maintains the sphere in this 90° position with respect to the platform until such time energy injection is again necessary. At this time the motor 66 is again energized in the opposite direction to return the sphere to the original position for energy injection.

The pivot point 65, is not shown in detail since any suitable pivot may be used. It is pointed out, however, that in addition to the helium supply pipes a passage 71 is necessary for the supply and return of power and signal energy.

Figure 6:
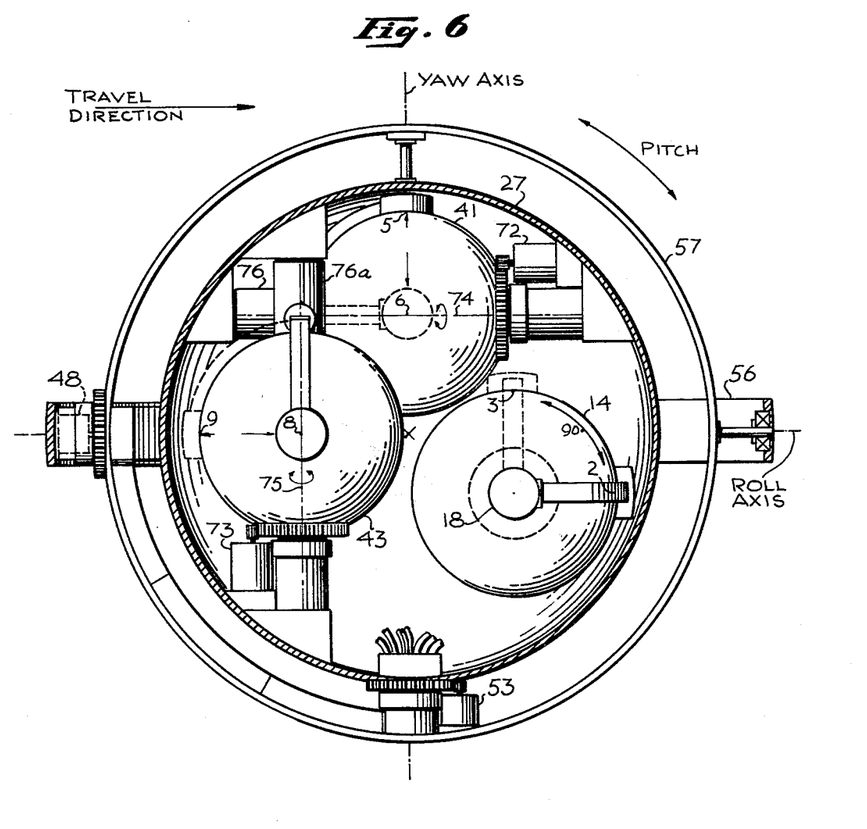
FIGURE 6 is a view of another gimbaled system utilizing the spheres provided with common detection and injection points such as shown in FIGURE 4.

FIGURE 6 is a schematic representation of a spherical platform T containing three sensing spheres such as the spheres 1, 4 and 7 of FIGURE 3 within the evacuated shells 14, 41 and 43. It is pointed out, however, that these three spheres are constructed with a single opening or aperture utilized for injection and detection purposes such as shown in FIGURE 4. The platform T in this figure is driven about the yaw axis by the drive motor 53 and its roll axis by the drive motor 48. In addition, the pitch axis is provided with the drive motor 25, not shown in this figure, but properly shown in FIGURE 3. These motors maintain the platform in proper reference with respect to the microwave energy within the spheres 1, 4 and 7 and outer shells 14, 41 and 43.

In addition to the 90° position motor 66 for the sphere 1 and shell 14, the spheres 4 and 7 within the shells 41 and 43, respectively are provided with drive motors 72 and 73, respectively. The motors 72 and 73 are for the purpose of shifting the shells 41 and 43 about their axes 74 and 75, respectively, for the purpose of shifting the wave guide associated with each sphere 4 and 7 between injection and detection positions.

In addition, the spheres 1, 4 and 7 located within the shells 14, 41 and 43, respectively, are shown to have separate signal generators such as the generators 18 and 76, and 76a shown in FIGURE 6. It is desirable in this arrangement to provide separate signal generators since the individual spheres are separately rotatable.

The platform T not only provides a support base for each of the three sensing spheres, but in addition, is capable of providing additional insulation through evacuation of the sphere shaped platform. It should be pointed out that with this arrangement, it is possible to eliminate the separate vacuum shells or spheres 14, 41 and 43 for each of the sensing spheres 1, 4 and 7. The platform T is again supported on gimbals 57 and 56 for universal movement such as the showing of FIGURE 3.

Figure 7:
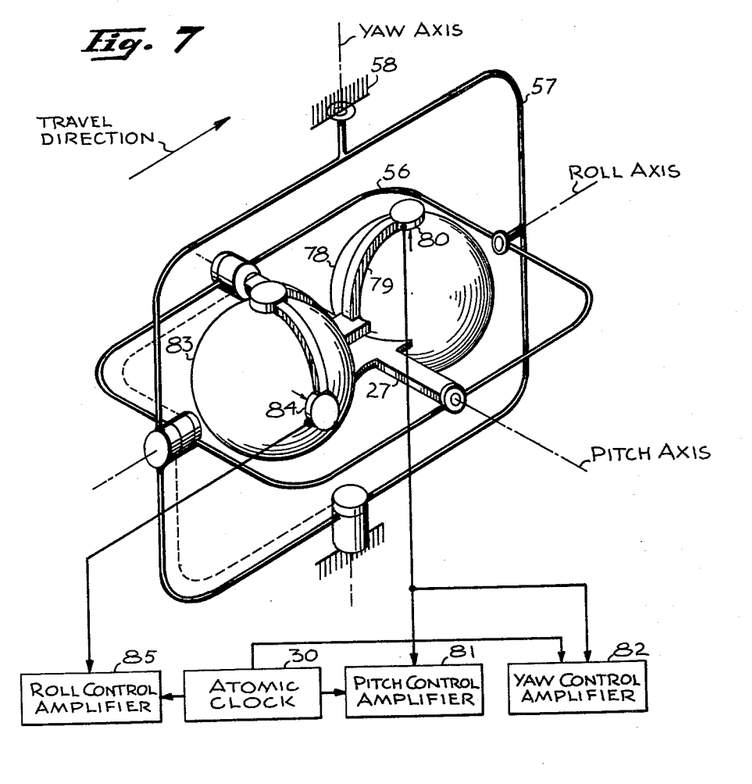
FIGURE 7 is a diagrammatic view of an embodiment of the invention utilizing two superconductive sensing enclosures.

FIGURE 7 represents a system utilizing two superconductive spheres for providing three axes detection. When a waveform is injected into the sphere such as sphere 78 by a suitable wave guide 79 a node point is established in the electrical field that is 90° displaced from the point of injection. If a detector such as a detector 80 is placed on the sphere at the node point, this detector is responsive to energy when displaced in any direction away from the node axis. If this detection signal is applied to two control amplifiers, 81 and 82 and compared with the atomic clock signal of the atomic clock 30 and with the detection amplifier 81 made responsive only to signals bearing approximately 180° or 360° reference to the atomic clock signal, while the control amplifier 82 is made responsive to signals bearing a 90° or 270° reference to the atomic clock 30, it can be seen the detection in two planes is accomplished by one sphere and detector. As shown, the control amplifier 81 responds to only one relative movement of the sphere 78 while the amplifier 82 responds to the other directional movement of the sphere 78. The only movement that the detector 80 can not respond to is a movement of the detector along the axis of the node of the wave within the sphere 78. In order to take care of this plane of operation, the sphere 83 is provided having a detector 84 positioned 90° in physical relationship with respect to the detector 80. The waveform injected into the sphere 83 is also injected at a point 90° from the waveform introduced into the sphere 78. For this reason, the detector 84 falls on the node of the waveform within the sphere 83.

With the spheres 78 and 83 securely mounted to a shaft or wave guide representing a platform 27, the physical relationship of the two spheres is maintained. The detector 84 being placed 90° with respect to the detector 80 provides an output to a control amplifier 85 which in turn provides an output signal in response to any rotational movement of the platform about the roll axis. This is the only plane of movement which cannot be sensed by the detector 80. The outputs of the amplifier 81, 82 and 85 are then filtered and utilized for vehicle control in the manner set forth in connection with FIGURE 3.

Figure 8:
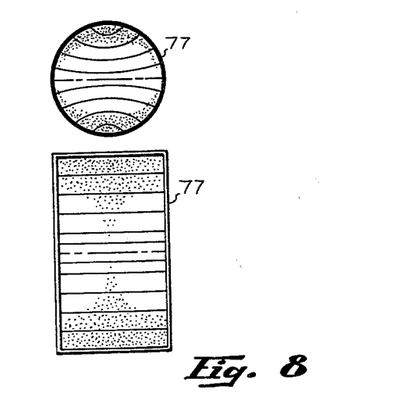
FIGURE 8 is a diagrammatic representation of a cylindrical superconductive container for use in the present inertial guidance system.

Although in the FIGURES 1 through 7 the sensing cavities are shown as spheres, it should be pointed out that the cavities could well be other shapes such as, for example, a cylinder such as a cylinder 77 as shown in FIGURE 8. Although the sphere is the ideal shape and any other container shape would introduce some distortion, under some circumstances such as space or shape requirements, a different configuration for the cavity may be desirable. The introduced distortion in the use of a cylinder occurs due to the fact that the waveform path increases and decreases with certain displacements of the container. This condition does not exist in a sphere and is, therefore, the reason for the desirability of spherical shape in cavity operation. A system showing the use of a cylinder in place of this sphere has not been specifically shown since it is only necessary to substitute the cylinder for the sphere on any one of the platforms. FIGURE 8 includes typical electric E and magnetic H field representations similar to the representations of FIGURE 4.

Some facts about actual dimension and operation are herein given although it is to be understood that these facts are not to be construed as representing the limits of the system but merely a typical system. For example, in some considerations for best life the superconducting spheres should measure between 1 foot and 1 meter in diameter. In addition, the superconducting material should be of sufficient depth to provide proper molecular action.

The life of the wave energy injected into each sphere or cavity depends upon the cavity size, temperature and frequency of the waveform.

While there has been described what is at present considered the preferred embodiments of the invention, it will be obvious to those skilled in the art that various changes and modifications may be made therein without departing from the invention.

What is claimed is:

1. In an interial guidance system,
   movable superconducting means defining a movable cavity,
   energy injecting means associated with said movable superconducting means for injecting energy into said movable cavity to establish a resonant wave having a predictable magnetic node position and being substantially free from displacement through movement of said movable cavity, and detecting means physically attached to said movable superconducting means and initially positioned at the originally established resonant wave magnetic node position, said detecting means being displaced, upon subsequent movement of said movable superconducting means, away from said resonant wave magnetic node position for response to cavity movement about said resonant wave.

2. In an inertial guidance system, movable superconducting means defining a movable cavity, energy injecting means associated with said movable superconducting means for injecting energy into said movable cavity to establish a resonant wave having a predictable magnetic node position and being substantially free from displacement through movement of said movable cavity, detecting means physically attached to said movable superconducting means and initially positioned at the originally established resonant wave magnetic node position, said detecting means being displaced, upon subsequent movement of said movable superconducting means, away from said node position for response to cavity movement about said resonant wave, and clock means provided with reference energy having a specific phase relationship with said resonant wave in said movable cavity.

3. In an inertial guidance system, movable superconducting means defining a movable cavity, energy injecting means associated with said movable superconducting means for injecting energy into said movable cavity to establish a resonant wave having a predictable node position and being substantially free from displacement through movement of said movable cavity, detecting means physically attached to said movable superconducting means and initially positioned at the originally established resonant wave node position, said detecting means being displaced, upon subsequent movement of said movable superconducting means, away from said resonant wave node position for response to cavity movement about said resonant wave, and clock means provided with reference energy having a specific phase relationship with said resonant energy wave in said cavity, said clock means being in the form of an atomic clock.

4. In an inertial guidance system, movable superconducting means defining a movable cavity, energy injecting means associated with said movable superconducting means for injecting energy into said movable cavity to establish a resonant wave having a predictable node position and being substantially free from displacement through movement of said movable cavity, detecting means physically attached to said movable superconducting means and initially positioned at the originally established resonant wave node position, said detecting means being displaced, upon subsequent movement of said movable superconducting means, away from said resonant wave node position for response to cavity movement about said resonant wave, and clock means provided with reference energy having a specific phase relationship with said resonant energy wave in said cavity, a phase sensitive amplifier being connected to said detector means and to said clock means for comparing any output of said detector means to the reference energy of said clock means.

5. In an inertial guidance system, movable superconducting means defining a movable cavity, energy injecting means associated with said movable superconducting means for injecting energy into said movable cavity to establish a resonant wave having a predictable magnetic node position and being substantially free from displacement through movement of said movable cavity, detecting means physically attached to said movable superconducting means and initially positioned at the originally established resonant wave magnetic node position, said detecting means being displaced, upon subsequent movement of said movable superconducting means, away from said resonant wave magnetic node position for response to cavity movement about said resonant wave, a first enclosure surrounding said superconducting means and spaced therefrom, and a cooling medium supply means connected to said first enclosure for providing a cooling medium within said space.

6. In an inertial guidance system, a movable superconducting means defining a movable cavity, energy injecting means associated with said movable superconducting means for injecting energy into said movable cavity to establish a resonant wave having a predictable magnetic node position and being substantially free from displacement through movement of said movable cavity, detecting means physically attached to said movable superconducting means and initially positioned at the originally established resonant wave magnetic node position, said detecting means being displaced, upon subsequent movement of said movable superconducting means, away from said resonant wave magnetic node position for response to cavity movement about said resonant wave, a first enclosure surrounding said superconducting means and spaced thereform, a cooling medium supply means connected to said first enclosure for providing a cooling medium within said space, and a second enclosure formed about said first enclosure and spaced therefrom, said second enclosure being evacuated to provide an insulation area about said first enclosure.

7. In an inertial guidance system, movable superconducting means defining a movable cavity, energy injecting means associated with said movable superconducting means for injecting energy into said movable cavity to establish a resonant wave having a predictable node position and being substantially free from displacement through movement of said movable cavity, and detecting means physically attached to said movable superconducting means and initially positioned at the originally established energy wave node position, said detecting means being displaced, upon subsequent movement of said movable superconducting means, away from said resonant wave node position for response to cavity movement about said resonant wave, said movable superconducting means being in the form of a sphere.

8. In an inertial guidance system, a plurality of movable superconducting means defining a plurality of movable cavities, energy injecting means associated with each of said plurality of movable superconducting means for injecting energy into each of said plurality of movable cavities to establish a plurality of resonant energy waves having predictable node positions and being substantially free from displacement through movement of each of said plurality of movable cavities, each node position of each resonant wave having a different orientation, and separate detecting means respectively physically attached to each of said movable superconducting means and initially positioned at the node position of the originally established resonant energy wave therein, said detecting means being displaced, upon subsequent movement of said movable superconducting means, away from each said energy wave node position.

9. In an inertial guidance system, a pair of movable superconducting means defining a pair of movable cavities, energy injecting means associated with each of said pair of movable superconducting means for injecting energy into each of said pair of movable cavities to establish a pair of resonant energy waves having predictable node positions and being substantially free from displacement through movement of each of said movable cavities, each node position of each resonant wave having a different orientation, separate detecting means respectively physically attached to each of said movable superconducting means and initially positioned at the node position of the originally established resonant energy wave therein, said detecting means being displaced, upon subsequent movement of said movable superconducting means, away from each said energy wave node position for response to cavity movement about said resonant energy waves, and clock means connected to each said injecting means for providing a phase relationship between said clock means and said injecting means.

10. In an inertial guidance system, a plurality of movable superconducting means defining a plurality of movable cavities, energy injecting means associated with each of said plurality of movable superconducting means for injecting energy into each of said plurality of movable cavities to establish a plurality of resonant energy waves having predictable node positions and being substantially free from displacement through movement of each of said plurality of movable cavities, each node position of each resonant wave having a different orientation, and separate detecting means respectively physically attached to each of said movable superconducting means and initially positioned at the node position of the originally established resonant energy wave therein, said detecting means being displaced, upon subsequent movement of said movable superconducting means, away from each said energy wave node position for response to cavity movement about said resonant energy waves, said plurality of movable superconducting means being in the form of spheres.

11. In an inertial guidance system, a plurality of movable superconducting means defining a plurality of movable cavities, energy injecting means associated with each of said plurality of movable superconducting means for injecting energy into each of said plurality of movable cavities to establish a plurality of resonant energy waves having predictable node positions and being substantially free from displacement through movement of each of said movable cavities, each node position of each resonant wave having a different orientation, separate detecting means respectively physically attached to each of said movable superconducting means and initially positioned at the node position of the originally established resonant energy wave therein, said detecting means being displaced, upon subsequent movement of said movable superconducting means, away from each said energy wave node position for response to cavity movement about said resonant waves, said plurality of movable superconducting means being in the form of spheres, second enclosure means surrounding each sphere in spaced relation therewith, and cooling means for supplying a cooling medium for said space between said spheres and said second enclosure means.

12. In an inertial guidance system, a plurality of movable superconducting means defining a plurality of movable cavities, energy injecting means associated with each of said plurality of movable superconducting means for injecting energy into each of said plurality of movable cavities to establish a plurality of resonant energy waves having predictable node positions and being substantially free from displacement through movement of each of said plurality of movable cavities, each node position of each resonant wave having a different orientation, separate detecting means respectively physically attached to each of said movable superconducting means and initially positioned at the node position of the originally established resonant energy wave therein, said detecting means being displaced, upon subsequent movement of said movable superconducting means, away from each said energy wave node position for response to cavity movement about said resonant energy waves, said plurality of movable superconducting means being in the form of three spheres, second enclosure means surrounding each sphere in spaced relation therewith, cooling means for supplying a cooling medium for each space between said spheres and said second enclosure means, and third enclosure means formed about said second enclosure means and spaced therefrom, said third enclosure means being evacuated for providing insulation.

13. In an inertial guidance system, a plurality of movable superconducting means defining a plurality of movable cavities, energy injecting means associated with each of said plurality of movable superconducting means for injecting energy into each of said plurality of movable cavities to establish a plurality of resonant energy waves having predictable node positions and being substantially free from displacement through movement of each of said plurality of movable cavities, each node position of each resonant wave having a different orientation, separate detecting means respectively physically attached to each of said movable superconducting means and initially positioned at the node position of the originally established resonant energy wave therein, said detecting means being displaced, upon subsequent movement of said movable superconducting means, away from each said resonant wave node position for response to cavity movement about said resonant energy waves, said plurality of movable superconducting means being in the form of spheres, second enclosure means surrounding each sphere in spaced relation therewith, cooling means connected to said second enclosure means, and a third enclosure means enclosing all said second enclosure means within a single envelope, said third enclosure being evacuated for providing insulation.

14. In an inertial guidance system, movable superconducting means defining a movable cavity, energy injecting means associated with said movable superconducting means for injecting energy into said movable cavity to establish a resonant wave having a predictable magnetic node position and being substantially free from displacement through movement of said movable cavity, and detecting means physically attached to said movable superconducting means and initially positioned at the originally established resonant wave magnetic node position, said detecting means being displaced, upon subsequent movement of said movable superconducting means, away from said resonant wave magnetic node position for response to cavity movement about said resonant wave, said injecting means comprising a microwave generator.

15. In an inertial guidance system, movable superconducting means defining a movable cavity, energy injecting means associated with said movable super conducting means for injecting energy into said movable cavity to establish a resonant wave having a predictable magnetic node position and being substantially free from displacement through movement of said movable cavity, and detecting means physically attached to said movable superconducting means and initially positioned at the originally established wave magnetic node position, said detecting means being displaced, upon subsequent movement of said movable superconducting means, away from said resonant wave magnetic node position for response to cavity movement about said resonant wave, said injecting means comprising a microwave generator and valve means for providing a microwave opening in said movable superconducting means at the proper time for energy injection.

16. In an inertial guidance system for a vehicle, a plurality of movable superconducting means defining a plurality of movable cavities, energy injecting means associated with each of said plurality of movable superconducting means for injecting energy into each of said plurality of movable cavities to establish a plurality of resonant energy waves having predictable node positions and being substantially free from displacement through movement of each of said plurality of movable cavities, each node position of each resonant wave having a different orientation, separate detecting means respectively physically attached to each of said movable superconducting means and initially positioned at the node position of the originally established resonant energy wave therein, said detecting means being displaced, upon subsequent movement of said movable superconducting means, away from each said energy wave node positions for response to cavity movement about said resonant energy waves, and a control system for sensing the output of each said detector means for the purpose of providing a vehicle control output.

17. In an inertial guidance system for a vehicle, a plurality of movable superconducting means defining a plurality of movable cavities, energy injecting means associated with each of said plurality of movable superconducting means for injecting energy into each of said plurality of movable cavities to establish a plurality of resonant energy waves having predictable node positions and being substantially free from displacement through movement of each of said plurality of movable cavities, each node position of each resonant wave having a different orientation, separate detecting means respectively physically attached to each of said movable superconducting means and initially positioned at the node position of the originally established resonant energy wave therein, said detecting means being displaced, upon subsequent movement of said movable superconducting means, away from each said energy wave node positions for response to cavity movement about said resonant waves, a control system for sensing the output of each said detector means for the purpose of providing a vehicle control output, a platform means provided with gimbaled support for said movable superconducting means, and driving means for repositioning said platform means in response to a deviation of said detector means from said energy wave node positions.

18. In an inertial guidance system, movable superconducting means for defining a movable cavity, energy injecting means associated with said movable superconducting means for injecting energy into said movable cavity to establish a resonant wave having a predictable magnetic node position and being substantially free from displacement through movement of said movable cavity, and detecting means physically attached to said movable superconducting means and initially positioned at the originally established resonant wave magnetic node position, said detecting means being displaced, upon subsequent movement of said movable superconducting means, away from said resonant wave magnetic node position for response to cavity movement about said resonant wave, said injecting and detecting means being provided through separate spaced apart openings in said movable superconducting means.

19. In an inertial guidance system, movable superconducting means for defining a movable cavity, energy injecting means associated with said movable superconducting means for injecting energy into said movable cavity to establish a resonant wave having a predictable node position and being substantially free from displacement through movement of said movable cavity, and detecting means physically attached to said movable superconducting means and initially positioned at the originally established resonant wave node position, said detecting means being displaced, upon subsequent movement of said movable superconducting means, away from said resonant wave node position for response to cavity movement about said resonant wave, said injecting and detecting means being operable through a single opening in said movable superconducting means.

20. In an inertial guidance system, movable superconducting means defining a movable cavity, energy injecting means associated with said movable superconducting means for injecting energy into said movable cavity to establish a resonant wave having a predictable node position and being substantially free from displacement through movement of said movable cavity, detecting means physically attached to said movable superconducting means and initially positioned at the originally established resonant wave node position,
said detecting means being displaced, upon subsequent movement of said movable superconducting means, away from said resonant wave node position for response to cavity movement about said resonant wave,
said injecting and detecting means being operable through a single opening in said movable superconducting means, and
drive means for selectively shifting said movable superconducting means between injection and detection positions.

21. In an inertial guidance system for a vehicle,
a plurality of movable superconducting means defining a plurality of movable cavities,
energy injecting means associated with each of said plurality of movable superconducting means for injecting energy into each of said plurality of movable cavities to establish a plurality of resonant energy waves having predictable node positions and being substantially free from displacement through movement of each of said plurality of movable cavities, each node position of each resonant wave having a different orientation,
separate detecting means respectively physically attached to each of said movable superconducting means and initially positioned at the node position of the originally established energy wave therein,
said detecting means being displaced, upon subsequent movement of said movable superconducting means, away from each said resonant wave node positions for response to cavity movement about said resonant energy waves,
a control system for sensing an output of each said detecting means for the purpose of providing a vehicle control output,
a platform means provided with gimbal support having said movable superconducting means pivotally supported thereon,
first driving means for repositioning said platform means in response to a deviation of said detecting means from said resonant energy wave node positions,
said movable superconducting means each having a single opening for injection and detection purposes, and
second drive means for selectively moving said movable superconducting means or said platform means between injection and detection positions.

22. An inertial guidance system for a vehicle comprising
a pair of movable superconducting means each defining a movable cavity,
energy injecting means associated with each said movable superconducting means for inserting energy into each said movable cavity to establish resonant energy waves therein having 90° displaced node positions and being substantially free from displacement through movement of each of said movable cavities, and
detecting means physically attached to each said movable superconducting means and initially positioned at the originally established resonant energy wave node positions,
said detecting means being displaced, upon subsequent movement of said movable superconducting means, in three planes for response to each cavity movement about each resonant energy wave.

23. An inertial guidance system for a vehicle comprising
a pair of movable superconducting means each defining a movable cavity,
energy injecting means associated with each said movable superconducting means for inserting energy into each said movable cavity to establish resonant energy waves therein having 90° displaced node positions and being substantially free from displacement through movement of each of said movable cavities,
separate detecting means respectively physically attached to each of said movable superconducting means and initially positioned at the originally established resonant energy wave node positions,
said detecting means being displaced, upon subsequent movement of said movable superconducting means, in three planes for response to each cavity movement about each energy wave, and
clock means provided with a reference energy wave having a specific phase relationship with each said resonant energy wave in each said movable cavity,
one of said movable superconducting means providing two planes of control by phase comparison of an output from said detecting means to said clock means,
the other said movable superconducting means providing the third plane of detection by its 90° displaced node position.

24. In an inertial guidance system,
movable superconducting means defining a movable cavity,
energy injecting means associated with said movable superconducting means for injecting energy into said movable cavity to establish a resonant wave having a predictable magnetic node position and being substantially free from displacement through movement of said movable cavity, and
detecting means physically attached to said movable superconducting means and initially positioned at the originally established resonant wave magnetic node position,
said detecting means being displaced, upon subsequent movement of said movable superconducting means, away from said resonant wave magnetic node position for response to cavity movement about said resonant wave,
said movable superconducting means being in the form of a cylinder.

25. In an inertial guidance system,
a plurality of movable superconducting means defining a plurality of movable cavities,
energy injecting means associated with each of said plurality of movable superconducting means for injecting energy into each of said plurality of movable cavities to establish a plurality of resonant energy waves having predictable node positions and being substantially free from displacement through movement of each of said movable cavities, each node position of each resonant wave having a different orientation, and
detecting means physically attached to each said movable superconducting means and initially positioned at each of the originally established resonant energy wave node positions,
said detecting means being displaced, upon subsequent movement of said movable superconducting means, away from each said energy wave node position for response to each cavity movement about each energy wave,
said plurality of movable superconducting means being in the form of cylinders.

26. In an inertial guidance system for a vehicle,
a plurality of movable superconducting means defining a plurality of movable cavities,
energy injecting means associated with each of said plurality of movable superconducting means for injecting energy into each of said plurality of movable cavities to establish a plurality of resonant energy waves having predictable node positions and being substantially free from displacement through movement of each of said movable cavities, each node position of each resonant wave having a different orientation,
separate detecting means respectively physically attached to each of said movable superconducting means and initially positioned at the node position of the originally established energy wave therein, said detecting means being displaced, upon subsequent movement of said movable superconducting means, away from each of said energy wave node positions for response to each cavity movement about each energy wave, a control system for sensing an output of each said detecting means for the purpose of providing a vehicle control output, a platform means provided with gimbal support having said movable superconducting means pivotally supported thereon, first driving means for repositioning said platform means in response to a deviation of said detecting means from said energy wave node positions, said movable superconducting means each having spaced apart openings for injection and detection purposes respectively, and second drive means for selectively moving said movable superconducting means on said platform means between injection and detection positions.

27. In an inertial guidance system, a plurality of movable superconducting means defining a plurality of movable cavities, energy injecting means associated with each of said plurality of movable superconducting means for injecting energy into each of said plurality of movable cavities to establish a plurality of resonant energy waves having predictable node positions and being substantially free from displacement through movement of each of said movable cavities, each node position of each resonant wave having a different orientation, separate detecting means respectively physically attached to each of said movable superconducting means and initially positioned at the node position of the originally established energy wave therein, said detecting means being displaced, upon subsequent movement of said movable superconducting means, away from each said energy wave node position for response to each cavity movement about each energy wave, and electrical shim means for each said plurality of movable superconducting means for adjusting the electrical resonant qualities of said movable superconducting means.

References Cited by the Examiner

UNITED STATES PATENTS

| | | | |
|---|---|---|---|
| 2,890,421 | 6/59 | Currie | 333—83 |
| 2,914,736 | 11/59 | Young | 333—99 |

OTHER REFERENCES

Maxwell et al.: Physical Review, vol. 76, No. 9, November 1949, pages 1332 to 1347.

Grebenkemper et al.: Physical Review, vol. 86, No. 5, June 1952, pages 673 to 679.

RICHARD C. QUEISSER, *Primary Examiner.*

F. M. SHADER, C. L. JUSTUS, M. R. WILBUR, JOSEPH P. STRIZAK, *Examiners.*